US010178131B2

(12) United States Patent
Nedeltchev et al.

(10) Patent No.: US 10,178,131 B2
(45) Date of Patent: Jan. 8, 2019

(54) ENTITY IDENTIFICATION FOR ENCLAVE SEGMENTATION IN A NETWORK

(71) Applicant: Cisco Technology, Inc., San Jose, CA (US)

(72) Inventors: Plamen Nedeltchev, San Jose, CA (US); Hugo Latapie, Long Beach, CA (US); Enzo Fenoglio, Issy-les-Moulineaux (FR); Manikandan Kesavan, Campbell, CA (US); Deon J. Chatterton, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/412,386

(22) Filed: Jan. 23, 2017

(65) Prior Publication Data
US 2018/0212996 A1   Jul. 26, 2018

(51) Int. Cl.
G06F 15/18 (2006.01)
G05B 13/02 (2006.01)
G05B 19/42 (2006.01)
H04L 29/06 (2006.01)
G06N 99/00 (2010.01)
H04L 29/08 (2006.01)
G06F 17/16 (2006.01)

(52) U.S. Cl.
CPC ............ H04L 63/20 (2013.01); G06F 17/16 (2013.01); G06N 99/005 (2013.01); H04L 67/10 (2013.01)

(58) Field of Classification Search
CPC ......... H04L 63/20; H04L 67/10; G06F 17/16; G06N 99/005

USPC ............ 700/12, 29, 55, 89, 173; 706/12, 13
See application file for complete search history.

(56) References Cited

U.S. PATENT DOCUMENTS

| 8,131,656 B2* | 3/2012 | Goldberg | G06N 3/126 706/13 |
| 8,479,155 B2* | 7/2013 | Kajiya | G06F 8/30 717/104 |
| 9,312,698 B2 | 4/2016 | Subbotin et al. | |

(Continued)

FOREIGN PATENT DOCUMENTS

| CN | 103795723 A | 5/2014 |
| WO | WO-2016111604 A1 | 7/2016 |
| WO | WO-2016144225 A1 | 9/2016 |

OTHER PUBLICATIONS

"Encryption by Default and Circles of Trust—Strategies to Secure Personal Information in High-Availability Environments", https://www.ipc.on.ca/wp-content/uploads/Resources/pbd-circlesoftrust.pdf, Dec. 2012, 20 pages, Ontario, Canada, Office of the Information and Privacy Commissioner.

(Continued)

*Primary Examiner* — Hsien Ming Lee
(74) *Attorney, Agent, or Firm* — Parker Ibrahim & Berg LLP; James M. Behmke; Stephen D. LeBarron

(57) ABSTRACT

In one embodiment, a device in a network identifies a set of network entities. The device determines characteristics of the network entities. The device assigns each of the set of network entities to one or more hyperedges of a hypergraph based on the characteristics. The device applies a security policy to a particular one of the network entities based on the one or more hyperedges of the hypergraph to which the particular network entity is assigned.

15 Claims, 8 Drawing Sheets

(56) References Cited

U.S. PATENT DOCUMENTS

| | | | |
|---|---|---|---|
| 2010/0228854 A1* | 9/2010 | Morrison | H04L 29/00 |
| | | | 709/224 |
| 2012/0293077 A1 | 11/2012 | Tousain et al. | |
| 2012/0331025 A1* | 12/2012 | Gemulla | G06F 15/781 |
| | | | 708/200 |
| 2014/0258196 A1* | 9/2014 | Dhurandhar | G06N 99/005 |
| | | | 706/20 |
| 2016/0029342 A1 | 1/2016 | Winand et al. | |
| 2017/0039368 A1* | 2/2017 | Grobman | G06F 21/31 |
| 2017/0243382 A1* | 8/2017 | Banerjee | G06T 11/206 |
| 2017/0293696 A1* | 10/2017 | Bendersky | G06F 17/30958 |

OTHER PUBLICATIONS

Mashal, et al., "Performance evaluation of recommendation algorithms on internet of things services", Physica A 451, pp. 646-656, 2016, Elsevier B.V.

Tsai, et al. "Data Mining for Internet of Things: A Survey", IEEE Communications Surveys & Tutorials, vol. 16, No. 1, First Quarter 2014, 21 pages, IEEE.

Yao, et al., "Unveiling Contextual Similarity of Things via Mining Human-Thing Interactions in the Internet of Things", https://arxiv.org/pdf/1512.08493.pdf, arXiv:1512.08493v2, 2015, 24 pages, arXiv.org.

Zhang, et al., "Managing Resources in Internet of Things with Semantic Hyper-Network Model", Proceedings of the Workshop on Enabling Technologies: Infrastructure for Collaborative Enterprises, WET ICE, 2012 IEEE 21st International WETICE, Jun. 2012, pp. 318-323, IEEE.

\* cited by examiner

ENTITY IDENTIFICATION FOR ENCLAVE SEGMENTATION IN A NETWORK

TECHNICAL FIELD

The present disclosure relates generally to computer networks, and, more particularly, to entity identification for enclave segmentation in a network.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking standpoint, however, it will become increasingly more challenging to restrict which services, interfaces, etc. are accessible to any given network entity. Notably, as the IoT continues to expand, it becomes increasingly more challenging to predict the number and variety of things connected to the network, which are used today for purposes of implementing access control, security, performance optimizations, etc.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network identifies a set of network entities. The device determines characteristics of the network entities. The device assigns each of the set of network entities to one or more hyperedges of a hypergraph based on the characteristics. The device applies a security policy to a particular one of the network entities based on the one or more hyperedges of the hypergraph to which the particular network entity is assigned.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
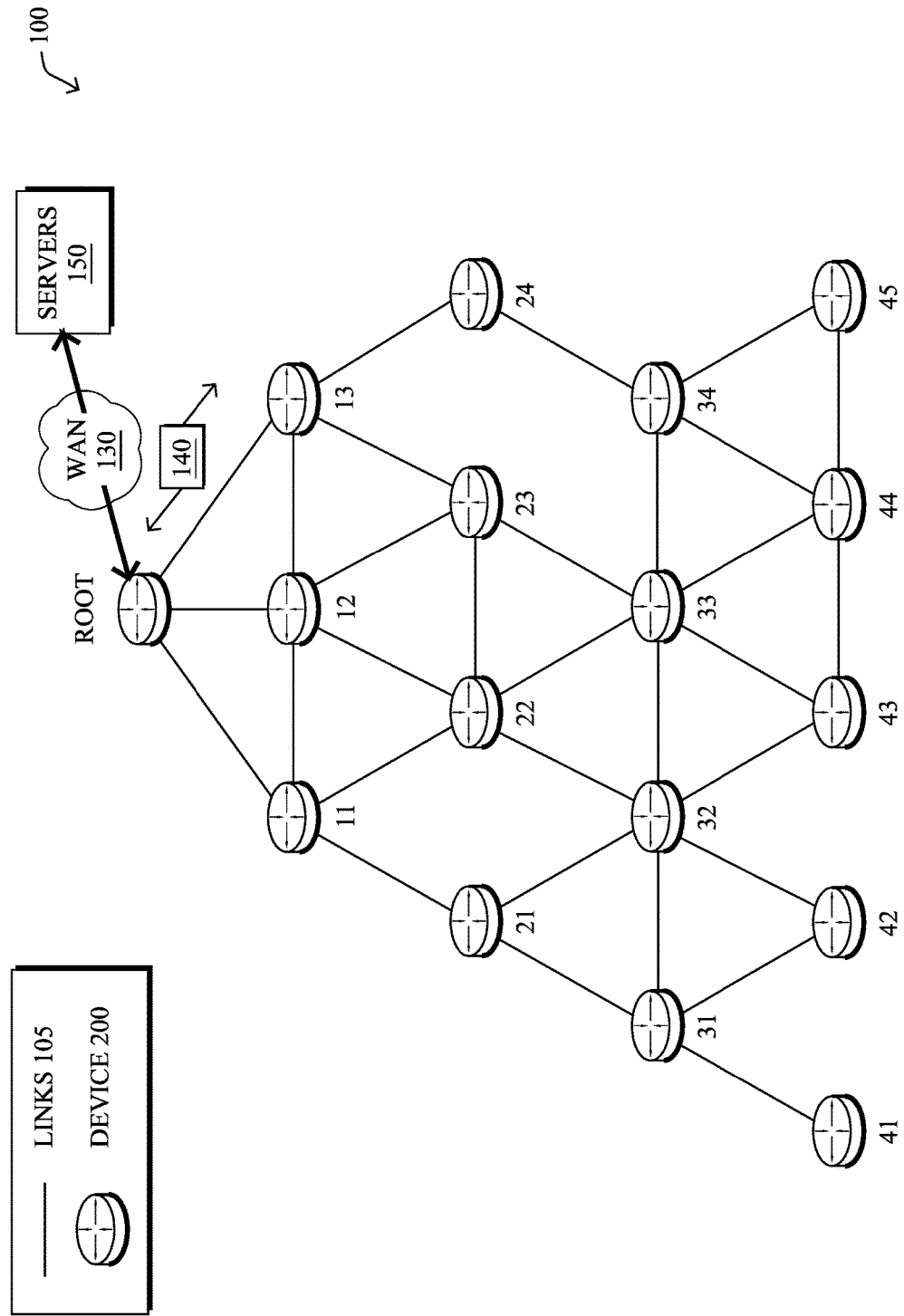
FIG. 1 illustrate an example communication network.

FIG. 1 is a schematic block diagram of an example computer network 100 illustratively comprising nodes/devices 200 (e.g., labeled as shown, "Root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc.

The illustrative Root node, such as a field area router (FARs), may interconnect the local network with a WAN 130, via which the root node may communicate with one or more other relevant devices such as management devices or servers 150, e.g., a network management server (NMS), a dynamic host configuration protocol (DHCP) server, a constrained application protocol (CoAP) server, a power outage management system (OMS), etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
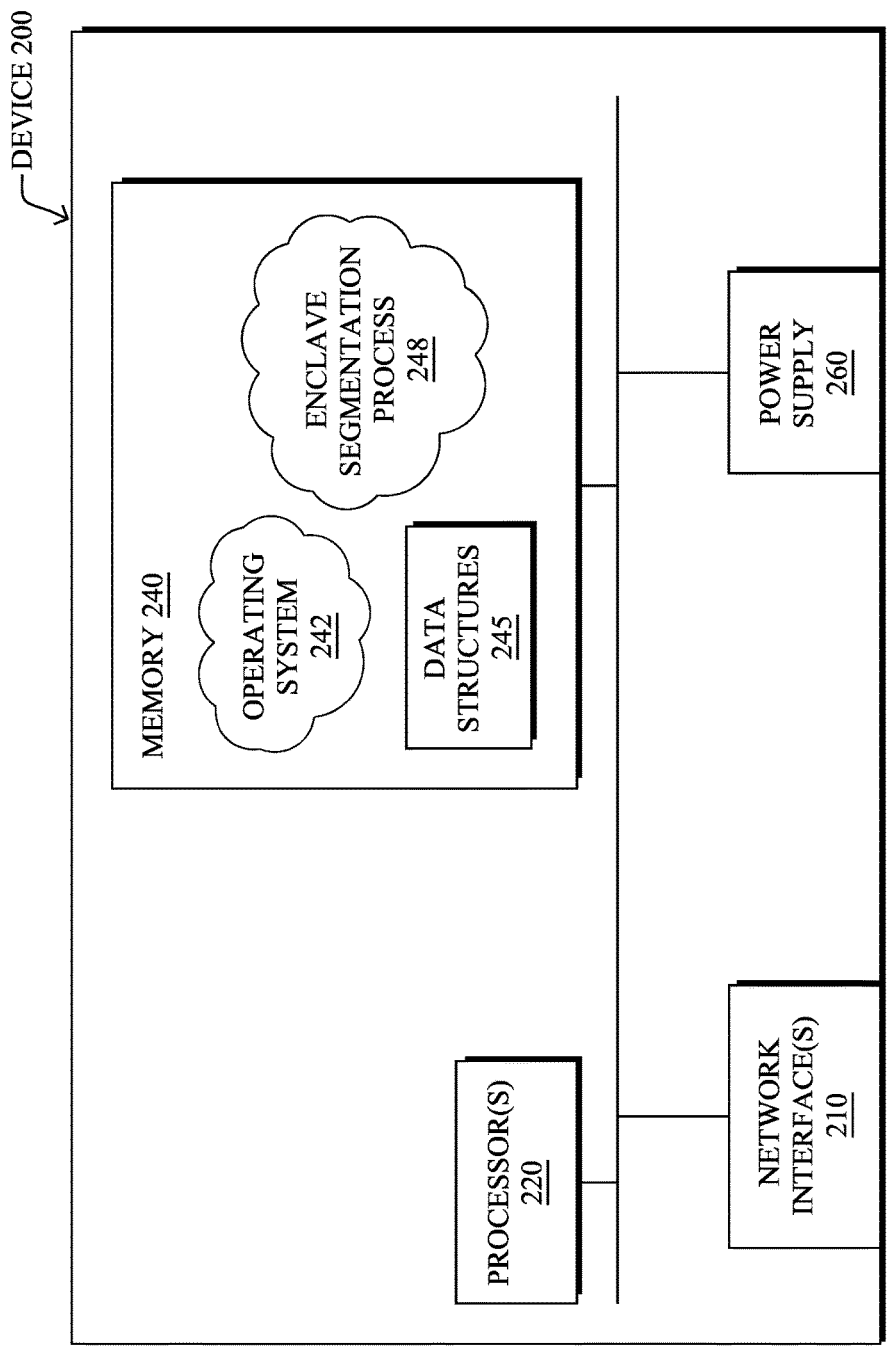
FIG. 2 illustrates an example network device/node.

FIG. 2 is a schematic block diagram of an example node/device 200 that may be used with one or more embodiments described herein, e.g., as any of the computing devices shown in FIG. 1 or any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an enclave segmentation process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Enclave segmentation process 248 includes computer executable instructions that, when executed by processor(s) 220, cause device 200 to segment entities in the network into enclaves to which different security policies are applied. For example, one such security policy may restrict the services, etc., that are available in the network to the entities in a quarantined enclave.

In various embodiments, enclave segmentation process 248 may employ one or more supervised, unsupervised, or semi-supervised machine learning techniques to assign a network entity to a security enclave. Generally, supervised learning entails the use of a training dataset to train the model to apply labels to the input data. For example, the training data may include sample labels indicative of the characteristics of the various entities that are to be assigned to the security enclaves (e.g., a set of labels for an entity to be quarantined, a set of labels for a trusted entity, etc.). On the other end of the spectrum are unsupervised techniques that do not require a training set of labels. Semi-supervised learning takes a middle ground approach that uses a greatly reduced set of labeled training data and attempts to infer the labels for the remaining set.

As noted above, as the IoT evolves, new service consumption models will be based on service owners (e.g., individuals/prosumers) bringing services to an enterprise environment and advertising these services for consumption. In addition, consumers subscribing to these services may do so in a location-agnostic manner, complementing the services offered by the enterprise itself. In other words, catalog-based service consumption prevalent today will eventually be replaced by dynamic publish-subscribe (pub-sub) types of associations.

From a security standpoint, one potential approach to a pub-sub type of environment would be to create flexible areas (e.g., zones/domains/enclaves) of restrictions or segmented services, based on the identity of the corresponding user. However, this also presents several challenges:

1.) Most of the "things" will not be capable of carrying IP traffic or implement any of existing authentication protocols currently used by users to establish identification, identity, or trust.

2.) Token or certificate based identities are often unsuitable for user identification of this scale and likely impossible to unify under a single identity model.

3.) The number of unknown 'things' to a network will continue to grow.

In other words, static, rule-based approaches to identity and security services may not be applicable in many instances, as time goes on.

Entity Identification for Enclave Segmentation in a Network

The techniques herein allow for the learning and creation of a pattern mining mechanism suitable for fully-scalable recognition of patterns in large, heterogeneous, and potentially real-time sets of nodes/things. Such information can then be used to identify nodes and dynamically associate the nodes/things with various security enclaves having different security policies. In some aspects, the enclaves may be represented as hyperedges of a hypergraph. For example, a given network entity may be assigned to a hyperedge that represents a trusted enclave, a quarantine enclave, or a guest enclave. In one aspect, the techniques herein may assign an entity to a security enclave using distributed information regularization with semi-supervised learning on the hypergraph. In such a case, labels for a limited number of entities may be known, with the task being to infer the labels of the remaining unlabeled nodes/entities in the hypergraph. In a further aspect, the techniques may instead use hierarchical Bayesian optimization, allowing an intelligent agent to learn a broad variety of regularities in its environment and direct its decision to assign a node/entity group one of the hyperedges/security enclaves (e.g., a trusted enclave, a quarantine enclave, etc.).

Specifically, according to one or more embodiments of the disclosure as described in detail below, a device in a network identifies a set of network entities. The device determines characteristics of the network entities. The device assigns each of the set of network entities to one or more hyperedges of a hypergraph based on the characteristics. The device applies a security policy to a particular one of the network entities based on the one or more hyperedges of the hypergraph to which the particular network entity is assigned.

Illustratively, the techniques described herein may be performed by hardware, software, and/or firmware, such as in accordance with enclave segmentation process 248, which may include computer executable instructions executed by the processor 220 (or independent processor of interfaces 210) to perform functions relating to the techniques described herein.

Figure 3:
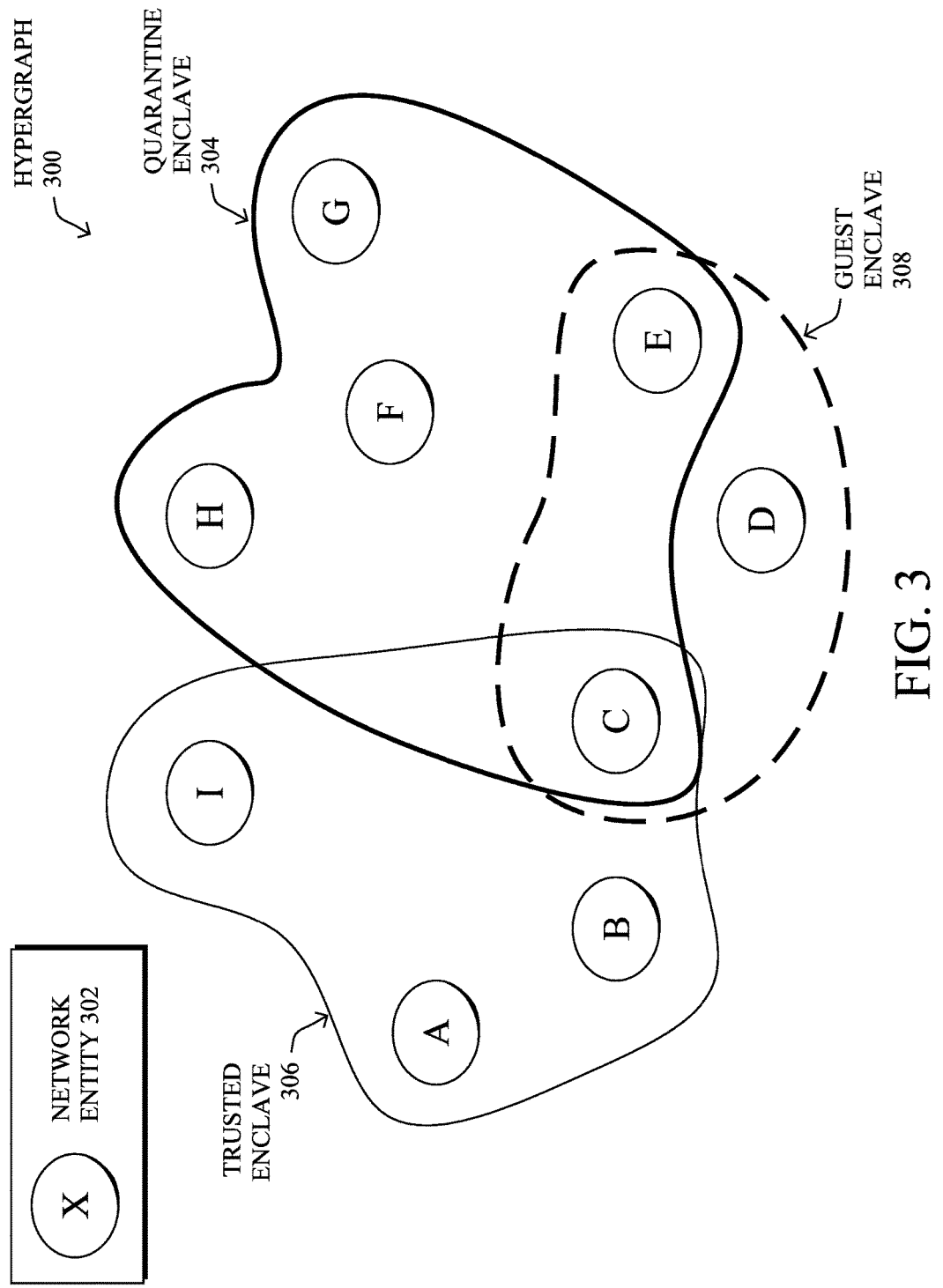
FIG. 3 illustrates an example of enclave segmentation in a network using a hypergraph.

Operationally, FIG. 3 illustrates an example of enclave segmentation in a network using a hypergraph 300, according to various embodiments. In general, a hypergraph is an extension to traditional graphs in which nodes are connected by edges, but also leverages the concept of "hyperedges" that can connect more than two nodes at a given time. As shown, the nodes of hypergraph 300 may represent the various network entities 302 in the network. As would be appreciated, pairwise graphs may not be applicable to identify IoT entities, as the relationships between such entities may be much more complex than simple pairwise relationships. Additionally, simply approximating complex relationships between entities 302 may also lead to a loss of information.

In various embodiments, network entities 302 (labeled nodes A-I for simplicity) may be physical nodes or virtual services present in the network. For example, physical nodes/things may include cameras, wearable electronic devices, mobile phones, connected vehicles, Bluetooth Low Energy™ devices, and the like. Virtual services may encompass any number of possible services such as, but not limited to, virtual bots (e.g., chat bots, automation bots, intelligent bots, etc.), avatars/proxy bots, and the like.

One potential advantage of using hypergraph 300 to represent the knowledge about network entities 302 is that it provides a flexible way to compactly represent multiple relevant forms of knowledge about entities 302 in a way that allows them to interoperate. Moreover, hypergraphs have more flexibility than simple graphs in describing prior knowledge, because known clusters can be directly encoded as hyperedges. For example, a chunk of knowledge in one category specific to a "thing" can overlap with a chunk of knowledge in another category, making pattern mining and heterogeneous associations possible.

Of note is that there are many possible relations between entities 302, much like in a semantic network. In addition, many relationships involve more than two entities 302 and there are also property predicates about a single entity. Further, there are many events represented, and the states of nodes may change over time. Accordingly, in various embodiments, the techniques herein learn from a hypergraph and develop a framework that is applicable to segmentation and clustering of complex relational data.

In some embodiments, each entity 302 (e.g., nodes in hypergraph 300) may be assigned to one or more hyperedges 304-308 of hypergraph 300 based on their observed or inferred characteristics and the learning mechanism in place. Accordingly, each hyperedge 304-306 may be associated with a security enclave to which a certain security policy may be applied. For example, entities A-C and I may be assigned to the trusted enclave 306, entities C-E may be assigned to the guest enclave 308, and entities C, E-H may be assigned to the quarantine enclave 304, as a result of the assignment process. In turn, different security policies may be applied to the entities 302, based on their assigned hyperedges/enclaves.

By way of example, entity G may be restricted from accessing most or all available services or other devices in the network, based on its membership in quarantine enclave 304. Conversely, entity A may be allowed to access more or all available services or other devices in the network, based on its membership in trusted enclave 306. Further, entity D may be allowed to access an intermediate number of services or other devices, based on its membership in guest enclave 308. Rules may also be applied, in some cases, when a given entity is a member of multiple enclaves. For example, entity C may belong to all three hyperedges/enclaves 304-308, but receive the highest amount of permissions based on its membership in trusted enclave 306.

Figure 4:
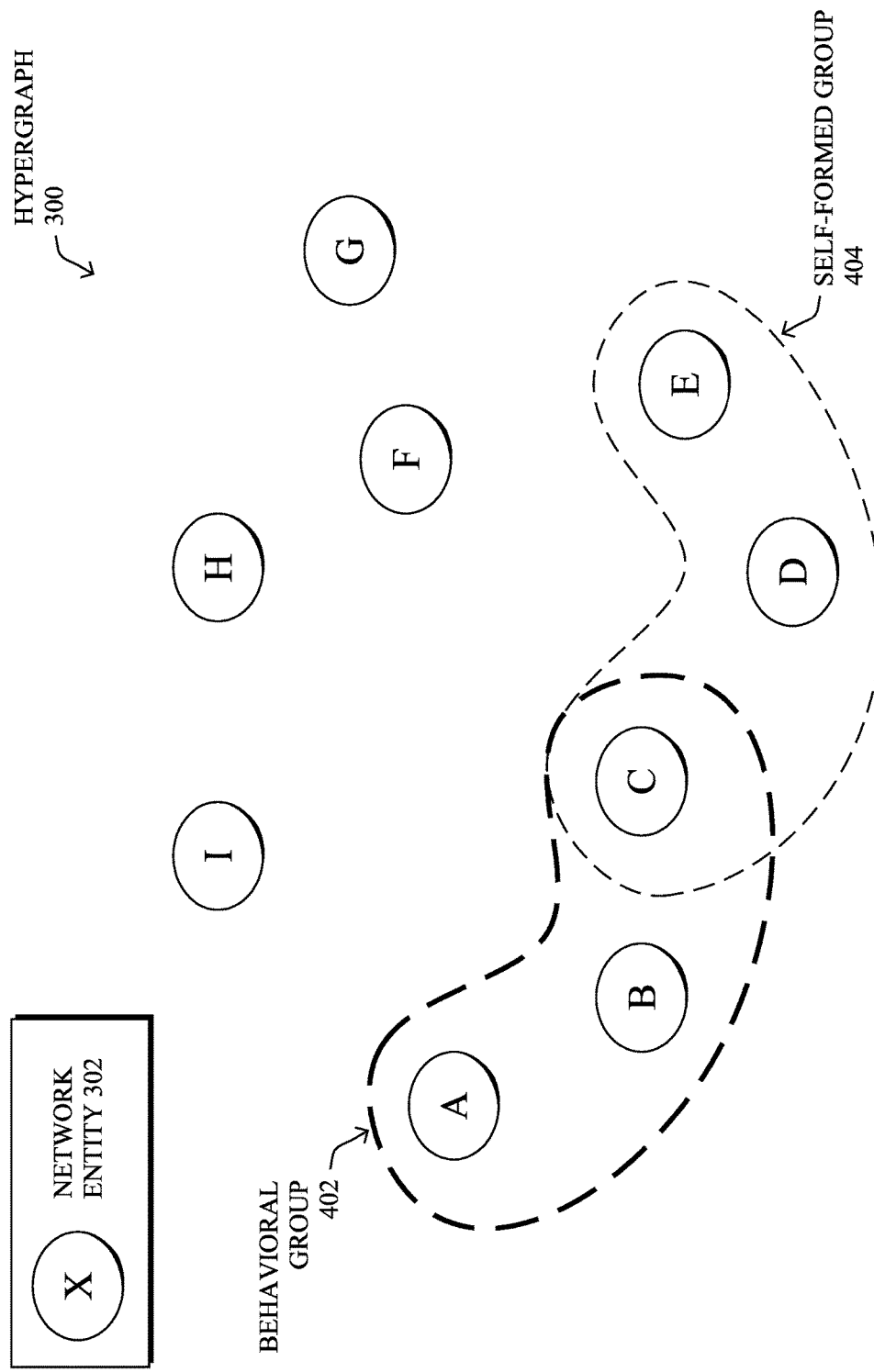
FIG. 4 illustrates an example of relationships between network entities.

FIG. 4 illustrates an example of how network entities 302 may be dynamically related, according to various embodiments. As shown, the characteristics of the entities 302 may be such that any given entity may belong to any number of sub-hypergraphs/groups. For example, behavioral group 402 may comprise entities A-C, which each execute a self-learning agent. Similarly, self-formed group 404 may comprise entities C-E that are interconnected by self-formed links (e.g., a mesh of beacon-based devices, etc.). In other words, each network entity 302 may have any number of relationships with any number of other entities 302 in the network.

Figure 5A:
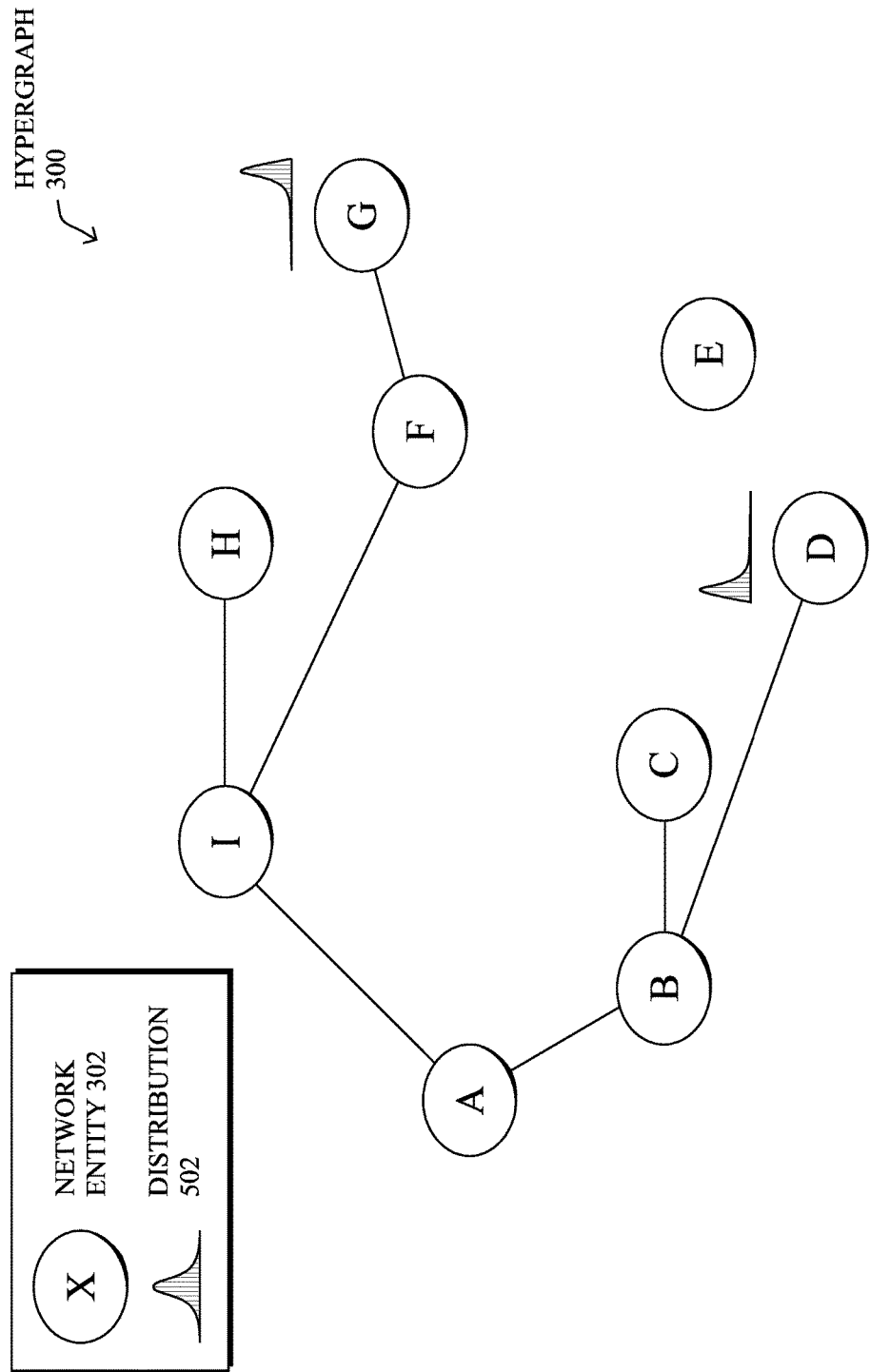
FIGS. 5A-5B illustrate examples of using semi-supervised learning to assign network entities to hyperedges of a hypergraph.
Figure 5B:
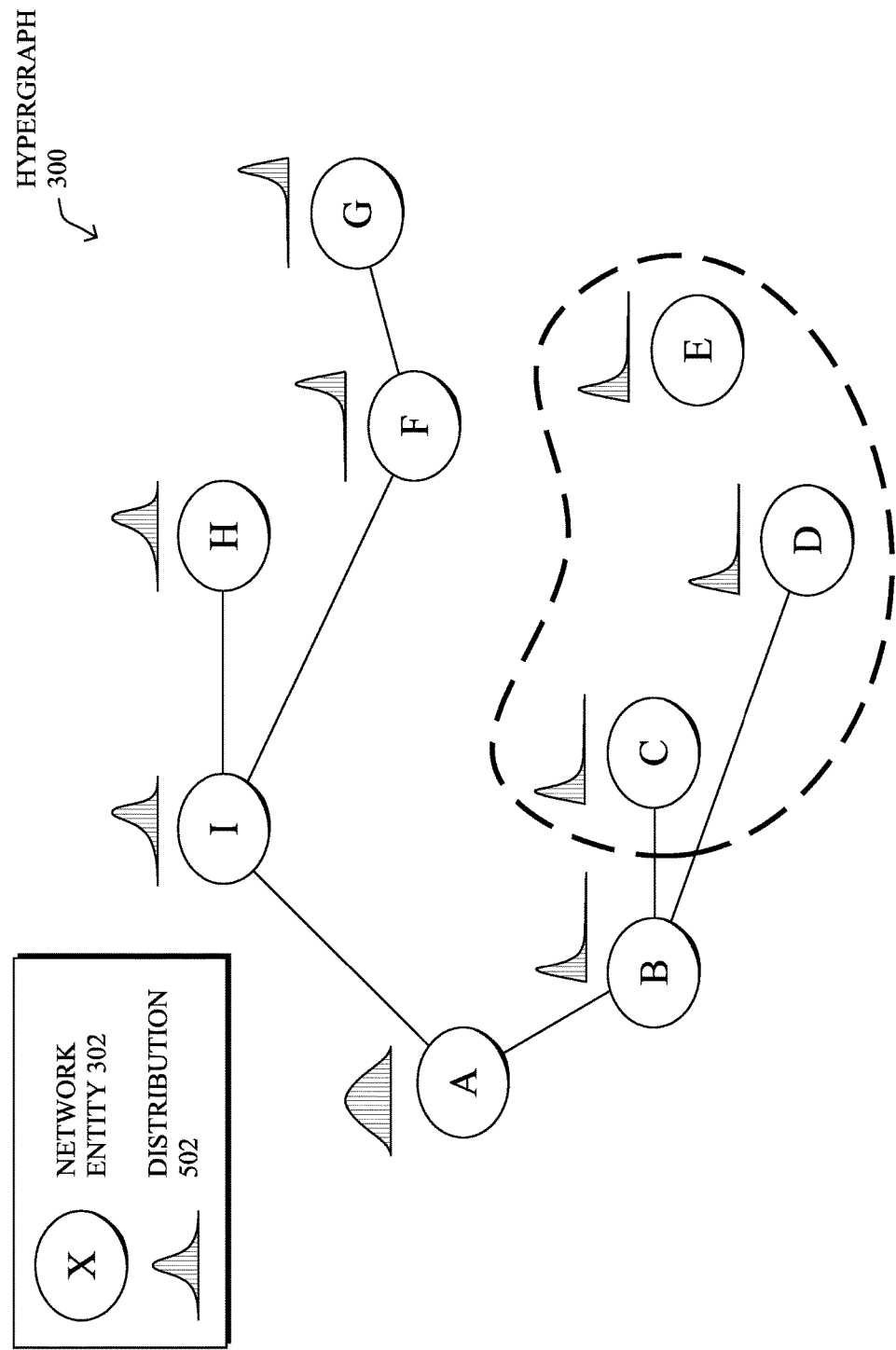

FIGS. 5A-5B illustrate examples of using semi-supervised learning to assign network entities 302 to hyperedges of a hypergraph, according to various embodiments. In general, this approach uses distributed information regularization with semi-supervised learning on hypergraphs to infer labels for a set of unlabeled nodes, based on the known labels for a limited number of entities.

In general, a label may be a representation of one characteristic of a given entity. For example, in some cases, a binary label may be set to '1' if an entity has a given characteristic (e.g., observed behavior, relationship or group membership, etc.) and '0' if the entity does not. Such labels can also be combined to form a set of labels that characterize a given entity. More specifically, a label in this sense stands for the prior information available about a particular node/entity. As would be appreciated, if an entity/node can be labeled, it can be recognized and identified for purposes of applying a security policy to it.

Assuming that a hyperedge represents the association between two or more nodes, it can also be assumed that the labels of adjacent nodes are likely to be the same. In turn, each hyperedge can have a weighting to represent the degree of association. For example, each hyperedge denoted as a trusted enclave (ET), a quarantine enclave (EQ), or a guest enclave (EG) can have a positive weight, representing the degree of association among the network entities 302.

Thus, each of the labeled nodes/entities 302 may have a probability distribution $p_i(y)$ where $y \in Y$ and Y is the set of labels. One of the goals of this approach, then, is to predict distributions $q_i(y)$ for the remaining unlabeled nodes/entities 302 based on the known $p_i(y)$ distributions and the group relations/hyperedges $R_k$. The assumption is that each node/entity in a given group $R_k$ has a similar distribution. For example, as shown in FIG. 5A, assume that labels are known for entities D and G, leading to their respective known distributions 502. The goal, then, is to propagate these distributions to the other unlabeled nodes/entities 302, to predict their distributions/labels based on their is relationships.

In various embodiments, a distribution may be propagated to other nodes/entities by attempting to minimize an information-based regularization term and a loss term. Generally, the information-based regularization term is based on the divergences among the distributions in a hyperedge. For example, the divergence may be a Kullback-Leibler divergence, as it is an efficient measure of the difference between two probabilistic pieces of information. Likewise, the loss function may represent the cost between predictions and labels at the labeled nodes. Then, the distributions are propagated by minimizing the regularization term together with the likelihood functions on labeled nodes under the assumption that, inside each hyperedge, the predicted distributions are similar to each other.

For example, one approach to using distributed information regularization would be to represent the optimization problem as follows:

$$\text{argmin}_{q_i} \sum_{i=1}^{n} \omega_i D(p_i, q_i) + \sum_{k=1}^{m} \lambda_k \sum_{i \in R_k} D(q_i, q_k^M)$$

where $w_i=\{0$ if node i unlabeled; 1 if node i is labeled$\}$, D( ) is the information measure between distributions that can be represented by, but not limited to, the Kullback-Leibler divergence, the symmetric Jeffrey divergence, the Jensen-Shannon divergence, or the like, $\lambda_k$ is the non-negative weight of $R_k$, and $q_k^M$ is a mixture-type regularizer representing the mixture center of $R_k$.

As shown in FIG. 5B, the known distributions 502 for entities/nodes D and G may be propagated to the other entities/nodes, thereby associating each of entities/nodes A-C, D-F, and H-I with distributions that give the degree of association. As would be expected, entities/nodes C-E belonging to the hyperedge shown have similar distributions after convergence. In this way, the predicted distributions can be used to assign each of the entities/nodes to a given hyperedge/enclave (e.g., a trusted, quarantine, or guest enclave). Eventually, each entity/node belonging to the trusted group may be assigned a unique identifier and its identity used to dictate its security policy, while there is no need to assign any identifier to entities/nodes in the guest or quarantine enclaves. Any new entity joining the network may also have an initial distribution that will be propagated accordingly and may be assigned to the most likely hyperedge/enclave.

Figure 6:
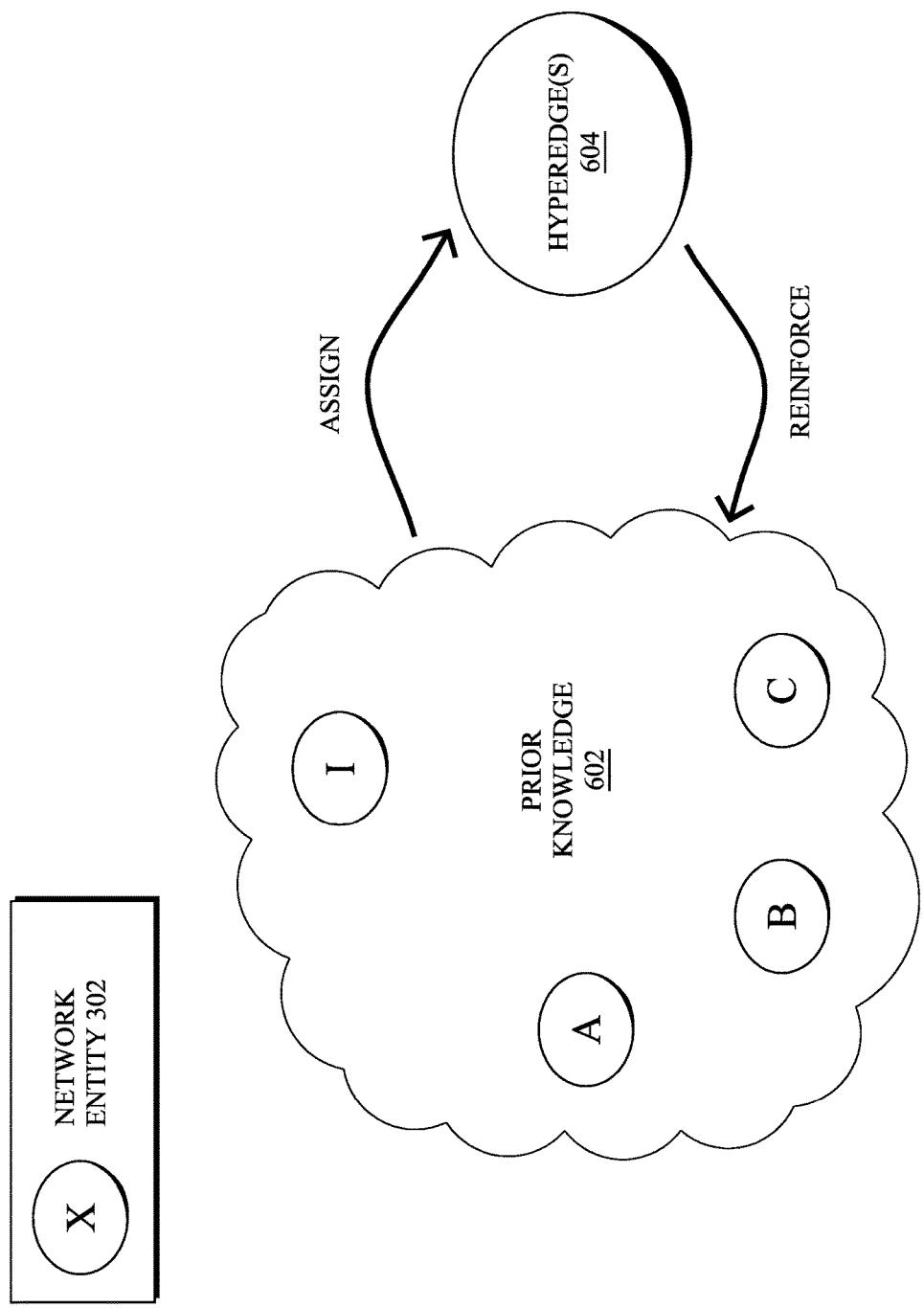
FIG. 6 illustrates an example of using hierarchical Bayesian optimization to assign network entities to hyperedges of a hypergraph.

FIG. 6 illustrates an example of using hierarchical Bayesian optimization to assign network entities to hyperedges of a hypergraph, according to various embodiments. In general, hierarchical Bayesian optimization is a variation of Bayesian optimization that decomposes the problem into multiple levels of a hierarchy. Combinations of the alternate partial solutions of one level can then be explored on the higher level(s). Notably these techniques combine prior information and the set of promising solutions to estimate their joint distributions, to determine the optimal solution.

As shown in the generalized example in FIG. 6, prior knowledge 602 regarding the network entities (e.g., their characteristics) can be leveraged to explore different assignments to hyperedge(s) 604 of the hypergraph. This can be performed iteratively to reinforce the prior knowledge/belief 602 regarding the entities.

By way of example, consider the case of an analysis device executing an intelligent agent that is close in the network to the entities (e.g., a fog device in a large building or manufacturing floor). During operation, the device may learn a broad variety of regularities or other interesting patterns in its environment (e.g., in terms of the characteristics/behaviors of the entities) and use this information to assign entities to the most likely hyperedge that reinforces the prior belief about the entities. For example, the device may assign the assessed entities to a quarantine, guest, or trusted hyperedge/enclave using this form of optimization. More specifically, the device may estimate the joint distributions between the combinations of prior knowledge 602 and the set of promising solutions/assignments, create enclaves of unknown behavior, and tweak the group to be trusted with a corresponding identifier. If, for example, one of the members of the group is identified (e.g., a PoE-based light), the other entities may also be assigned to the trusted hyperedge/enclave. Conversely, the device may assign outliers belonging to weak solutions to the quarantine hyperedge/enclave. Any remaining entities can then be assigned to the guest hyperedge/enclave.

Figure 7:
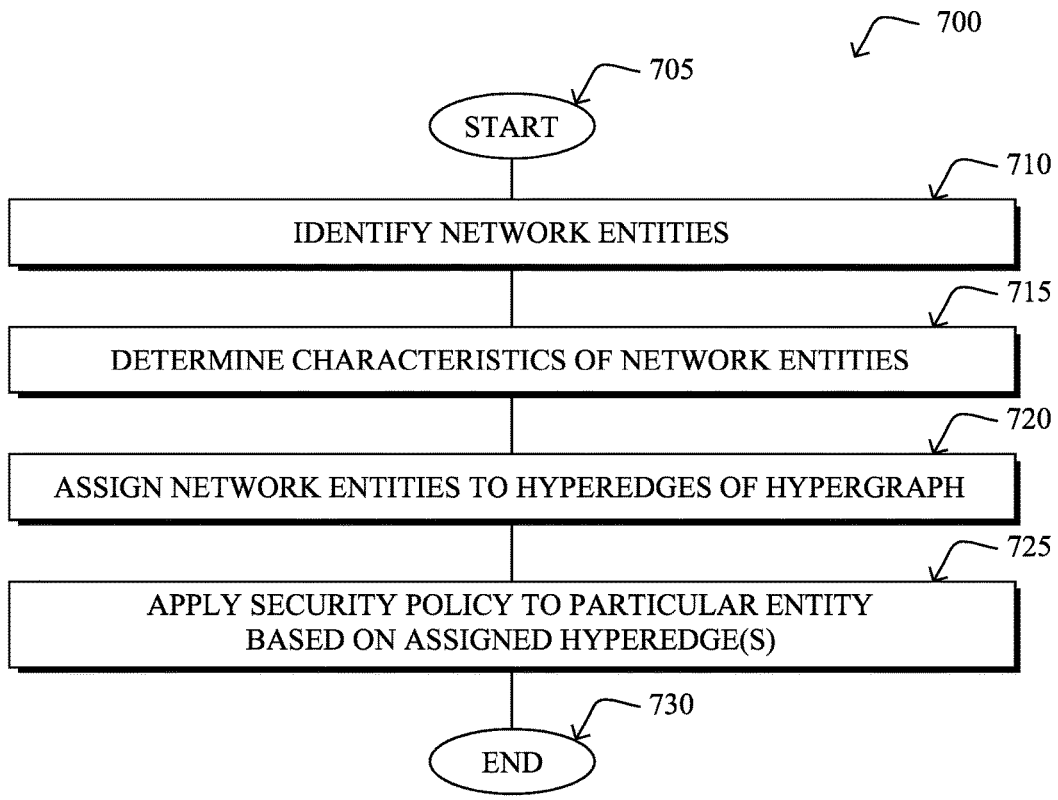
FIG. 7 illustrates an example simplified procedure for applying a security policy to network entities assigned to a particular hyperedge of a hypergraph.

FIG. 7 illustrates an example simplified procedure for applying a security policy to network entities assigned to a particular hyperedge of a hypergraph, in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, the device may identify a set of network entities. In some cases, the entities may include physical nodes in the network (e.g., cellular phones, wearable devices, etc.). In further cases, the entities may include virtual services offered by physical devices (e.g., chat bots, intelligent agents, etc.).

At step 715, as detailed above, the device may determine characteristics of the networking entities. In general, such characteristics may be indicative of the behavior of an entity (e.g., based on observed traffic associated with the entity, etc.), capabilities of an entity (e.g., service type, hardware or software configuration, etc.), relationships between entities, or any other information that can be garnered about the entities. As would be appreciated, in many instances, the characteristics of only a subset of the networking entities may be available to the device. For example, the device may receive characteristic information regarding one or more of the entities for which their identities are already known (e.g., as part of a semi-supervised learning training dataset).

At step 720, the device may assign the entities to hyperedges of a hypergraph, as described in greater detail above. Generally, hyperedges allow more than two nodes/entities to be connected within the hypergraph. The device may use any number of learning techniques, to assign a particular entity to a hyperedge based on the known characteristics of the entities. In one embodiment, if the characteristics (e.g., labels) of only a subset of the entities is known, the device may use distributed information regularization with semi-supervised learning, to propagate distributions to the unlabeled entities and group entities having similar distributions. In another embodiment, the device may use a reinforced learning approach whereby the joint distributions of the assigned entities and the known information are assessed, to reinforce the prior belief about the entities (e.g., using hierarchical Bayesian optimization, etc.).

At step 725, as detailed above, the device may apply a security policy to a particular entity based on the hyperedge(s) to which the entity is assigned. In various embodiments, the hyperedges of step 720 may represent security enclaves, such as a trusted enclave, a quarantine enclave, and a guest enclave, each having different associated security policies. For example, an entity assigned to the trusted enclave may be authorized to publish its services to the network, whereas an entity in the quarantine enclave may not. As would be appreciated, the assignments to the hyperedges/enclaves may be performed dynamically, to update the assignments, accordingly (e.g., when further characteristic information becomes available, when a new entity joins the network, etc.). Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, use machine learning to identify and segment IoT entities in a network. In some aspects, the techniques can identify an unpredictable number and variety of entities, and build enclaves of trust based on the machine learning-based behavioral analysis. The approaches herein will also scale well, as the system can identify the enclave and tag one of the members with an enclave tag. That tag can be later populated among all other things that belong to the same enclave (e.g., a shared key or other unique identifier, etc.). Further, known entities can be marked and identified using supervised learning and reinforced learning can also be used to identify unknown entities. The type of segmentation introduced herein will also allow many enclaves to be associated with a particular token, identifier, security policy, etc. (e.g., all PoE LED lights will be treated the same way).

While there have been shown and described illustrative embodiments that provide for entity identification for enclave segmentation, it is to be understood that various other adaptations and modifications may be made within the spirit and scope of the embodiments herein. For example, while certain embodiments are described herein with respect to using certain machine learning techniques to assign entities to hyperedges/enclaves, the techniques herein are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
identifying, by a device in a network, a set of network entities;
determining, by the device, characteristics of the network entities;

assigning, by the device, each of the set of network entities to at least one of three different types of hyperedges of a hypergraph based on the determined characteristics, wherein the three different types of hyperedges include a trusted enclave of entities, a guest enclave of entities, and a quarantine enclave of entities and assigning each of the set of network entities to one or more hyperedges of a hypergraph includes:
  using, by the device, reinforced learning to assign the network entities to one or more of the hyperedges of the hypergraph; and
  applying, by the device, a security policy to a network entity in the set of network entities based on the type of hyperedge the network entity is assigned.

2. The method as in claim 1, wherein assigning each of the set of network entities to one or more hyperedges of a hypergraph comprises:
  labeling, by the device, one of the network entities using a set of labels that are based on the determined characteristics for the entity; and
  using, by the device, the set of labels for the labeled entity to infer labels for the unlabeled network entities.

3. The method as in claim 2, wherein using the labeled one or more network entities to infer labels for the unlabeled network entities comprises:
  determining, by the device, a distribution of the set of labels for the labeled entity;
  propagating, by the device, the distribution to the other network entities in the hypergraph to infer a distribution for each of the entities; and
  assigning, by the device, those of the entities with similar distributions to the same hyperedge of the hypergraph.

4. The method as in claim 3, wherein propagating the distribution to one of the other network entities in the hypergraph to infer a distribution for the other entity comprises:
  minimizing, by the device, a loss term and a Kullback-Leibler (KL)-based regularization term.

5. The method as in claim 1, wherein the network entities comprise one or more of: a physical node in the network or a virtual service in the network.

6. The method as in claim 1, wherein using reinforced learning to assign the network entities to one or more of the hyperedges of the hypergraph comprises:
  applying, by the device, hierarchical Bayesian optimization to assign one of the network entities to one of the hyperedges.

7. An apparatus, comprising:
  one or more network interfaces to communicate with a network;
  a processor coupled to the one or more network interfaces and configured to execute a process; and
  a memory configured to store the process executable by the processor, the process when executed operable to:
    identify a set of network entities;
    determine characteristics of the network entities;
    assign each of the set of network entities to at least one of three different types of hyperedges of a hypergraph based on the determined characteristics, wherein the three different types of hyperedges include a trusted enclave of entities, a guest enclave of entities, and a quarantine enclave of entities and the apparatus assigns each of the set of network entities to one or more hyperedges of a hypergraph by:
      using reinforced learning to assign the network entities to one or more of the hyperedges of the hypergraph; and
      apply a security policy to a network entity in the set of network entities based on the type of hyperedge the network entity is assigned.

8. The apparatus as in claim 7, wherein the apparatus assigns each of the set of network entities to one or more hyperedges of a hypergraph by:
  labeling one of the network entities using a set of labels that are based on the determined characteristics for the entity; and
  using the set of labels for the labeled entity to infer labels for the unlabeled network entities.

9. The apparatus as in claim 8, wherein the apparatus uses the labeled one or more network entities to infer labels for the unlabeled network entities by:
  determining a distribution of the set of labels for the labeled entity;
  propagating the distribution to the other network entities in the hypergraph to infer a distribution for each of the entities; and
  assigning those of the entities with similar distributions to the same hyperedge of the hypergraph.

10. The apparatus as in claim 9, wherein the apparatus propagates the distribution to one of the other network entities in the hypergraph to infer a distribution for the other entity by:
  minimizing a loss term and a Kullback-Leibler (KL)-based regularization term.

11. The apparatus as in claim 7, wherein the network entities comprise one or more of: a physical node in the network or a virtual service in the network.

12. The apparatus as in claim 7, wherein the apparatus uses reinforced learning to assign the network entities to one or more of the hyperedges of the hypergraph by:
  applying hierarchical Bayesian optimization to assign one of the network entities to one of the hyperedges.

13. A tangible, non-transitory, computer-readable medium storing program instructions that, when executed by a device in a network, cause the device to perform a process comprising:
  identifying, by the device, a set of network entities;
  determining, by the device, characteristics of the network entities;
  assigning, by the device, each of the set of network entities to at least one of three different types of hyperedges of a hypergraph based on the determined characteristics, wherein the three different types of hyperedges include a trusted enclave of entities, a guest enclave or entities, and a quarantine enclave of entities and assigning each of the set of network entities to one or more hyperedges of a hypergraph includes:
    using, by the device, reinforced learning to assign the network entities to one or more of the hyperedges of the hypergraph; and
  applying, by the device, a security policy to a network entity in the set of network entities based on the type of hyperedge the network entity is assigned.

14. The computer-readable medium as in claim 13, wherein assigning each of the set of network entities to one or more hyperedges of a hypergraph comprises:
  labeling, by the device, one of the network entities using a set of labels that are based on the determined characteristics for the entity; and
  using, by the device, the set of labels for the labeled entity to infer labels for the unlabeled network entities.

15. The computer-readable media as in claim 13, wherein the network entities comprise one or more of: a physical node in the network or a virtual service in the network.

* * * * *